(12) United States Patent
Donauer et al.

(10) Patent No.: US 10,702,821 B2
(45) Date of Patent: Jul. 7, 2020

(54) ANNULAR FILTER ELEMENT, IN PARTICULAR FOR GAS FILTRATION, AND FILTER DEVICE

(71) Applicant: MANN+HUMMEL GmbH, Ludwigsburg OT (DE)

(72) Inventors: Nadine Donauer, Fellbach (DE); Pedro Miguel Pereira Madeira, Bietigheim-Bissingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/177,594

(22) Filed: Nov. 1, 2018

(65) Prior Publication Data

US 2019/0060814 A1 Feb. 28, 2019

Related U.S. Application Data

(63) Continuation of application No. PCT/EP2017/055257, filed on Mar. 7, 2017.

(30) Foreign Application Priority Data

May 3, 2016 (DE) ........................ 10 2016 005 355

(51) Int. Cl.
*B01D 46/24* (2006.01)
*B01D 46/00* (2006.01)
*F02M 35/024* (2006.01)

(52) U.S. Cl.
CPC ...... *B01D 46/2411* (2013.01); *B01D 46/0005* (2013.01); *B01D 46/0024* (2013.01); *F02M 35/02441* (2013.01); *B01D 2265/06* (2013.01); *B01D 2271/027* (2013.01); *B01D 2275/208* (2013.01)

(58) Field of Classification Search
CPC ............ B01D 46/2411; B01D 46/2414; B01D 2265/06; B01D 2271/027; B01D 46/0005; F02M 35/02416
See application file for complete search history.

(56) References Cited

U.S. PATENT DOCUMENTS

| 2011/0000174 A1* | 1/2011 | Kapelarie | ......... B01D 46/2414 55/492 |
| 2014/0102058 A1* | 4/2014 | Kaufmann | ......... B01D 46/0004 55/482 |
| 2014/0157741 A1 | 6/2014 | Baseotto et al. | |

FOREIGN PATENT DOCUMENTS

| DE | 102008008328 A1 | 8/2008 |
| DE | 112008002445 A5 | 9/2010 |
| DE | 102013014498 A1 | 3/2015 |

(Continued)

*Primary Examiner* — Robert Clemente
(74) *Attorney, Agent, or Firm* — James Hasselbeck

(57) ABSTRACT

An annular filter element has a filter medium body that can be flowed through in a radial direction by a fluid to be cleaned. A central tube is arranged at an inner side of the filter medium body. A support collar is connected to the central tube and provides an end face forming an axial support surface for a housing component of a filter housing. A sealing element is connected to the support collar. The support collar has a radial side face, wherein the radial side face carries the sealing element and forms a sealing surface for the housing component, wherein the sealing surface is spaced apart from the axial support surface. The support collar is formed together with the central tube as one piece.

10 Claims, 3 Drawing Sheets

(56) References Cited

FOREIGN PATENT DOCUMENTS

| | | |
|---|---|---|
| EP | 1306117 B1 | 5/2003 |
| EP | 1812138 B1 | 8/2007 |
| EP | 2132430 A1 | 10/2008 |
| EP | 2396102 A1 | 8/2010 |
| EP | 2227307 B1 | 9/2010 |
| EP | 2720773 A1 | 12/2012 |
| JP | S58106553 U | 7/1983 |
| JP | H08252417 A | 10/1996 |

\* cited by examiner

ANNULAR FILTER ELEMENT, IN PARTICULAR FOR GAS FILTRATION, AND FILTER DEVICE

CROSS-REFERENCE TO RELATED APPLICATIONS

This application is a continuation application of international application No. PCT/EP2017/055257, having an international filing date of 7 Mar. 2017 and designating the United States, the international application claiming a priority date of 3 May 2016 based on prior filed German patent application No. 10 2016 005 355.0, the entire contents of the aforesaid international application and the aforesaid German patent application being incorporated herein by reference.

BACKGROUND OF THE INVENTION

The invention relates to an annular filter element, in particular for gas filtration, for example, for an air filter, with a filter medium body, which in radial direction can be flowed through by the fluid to be cleaned, and with a central tube at the inner side of the filter medium body, wherein a support collar is connected to the central tube and is a carrier of a sealing element, wherein the end face of the support collar forms an axial support surface for a housing component.

Furthermore, the invention concerns a filter device with such a filter element. DE 10 2007 017 091 A1 discloses an annular filter element for an air filter of an internal combustion engine that comprises an annular filter medium body which is to be flowed through by the air in radial direction from the exterior to the interior and which is covered at its axial end faces by an end disk. The interior in the filter medium body is lined by a central tube comprising stays in axial direction and in circumferential direction and contributing to stabilization of the filter element. At an end face, the central tube comprises a support collar which is resting against the end disk and extends radially in outward direction. The support collar projects past the end disk in axial direction and is enveloped by a sealing material. At the axial end face of the support collar, a support stay extends in circumferential direction and absorbs axial sealing forces, which are exerted by an attached cover, and introduces them through radially offset stays into the central tube.

The invention has the object to configure an annularly closed filter element and a filter device with such a filter element with simple constructive measures in such a way that, in the region of the end face of the filter element, seal tightness between raw side and clean side is ensured over a long operating period.

SUMMARY OF THE INVENTION

This object is solved according to the invention by a filter element that is characterized in that a radial side face of the support collar, as a carrier of the sealing element, forms a sealing surface for the housing component that is spaced apart from the axial support surface, and wherein the support collar is formed together with the central tube as one piece. The object is solved furthermore by a filter device comprising such a filter element and a filter housing for receiving the filter element, wherein the filter element is insertable in such a way into the filter housing that the filter element is supported with the end face of the support collar at a housing component.

The dependent claims provide expedient further developments.

The filter element according to the invention is embodied annularly closed and is radially flowed through by the fluid to be cleaned. The basic cross section of the filter element can be embodied circular or oval, optionally in the form of an elongate oval or in the form of two semicircles that are connected by straight or convexly curved sections. The annular filter element encloses an interior which is lined by a central tube forming a support frame and located at a wall side of a filter medium body of the filter element delimiting the interior. The central tube has flow openings for flow of the fluid to be cleaned therethrough and is comprised in particular of axial stays as well as circumferential stays between which the flow openings are formed. The flow through the filter medium body where the filtration takes place is realized preferably in radial direction from the exterior to the interior so that the interior forms the clean side.

The annular filter element is preferably used for gas filtration, in particular as an air filter for internal combustion engines, in particular of motor vehicles or commercial vehicles. However, use for filtration of liquids is conceivable also. A support collar is connected to the central tube and is at least partially covered by a sealing element. The support collar is located at an axial end face of the central tube and projects advantageously axially past the end face of the filter medium body. The support collar serves, on the one hand, for absorbing axial forces which in operation are acting on the filter element and, on the other hand, for flow-tight separation of the raw side from the clean side in the region of the end face of the filter element.

In the annular filter element according to the invention, the support surface for the housing component onto which the filter element is placed and the sealing surface for sealing are arranged at a spacing relative to each other at the support collar. The support surface is formed by the end face of the support collar which is projecting axially past the filter medium body. The housing component is resting against this end face; the axial forces which are exerted by the housing component are introduced through the support collar into the central tube of the filter element so that the filter medium body, including the end disk at the filter medium body, is relieved from the axial supporting forces.

The sealing surface is formed by a side face of the support collar facing radially inwardly or outwardly. Preferably, the side face which is forming the sealing surface is facing radially inwardly. At this radial side face of the support collar, there is also sealing material of the sealing element and a further section of the housing component is resting against it. Axial forces are not transmitted at the sealing surface of the support collar; the transmission of the axial forces is realized exclusively or substantially through the support surface at the end face of the support collar. In this way, a decoupling of axial support action and radial sealing action between the filter element and the housing component, for example, an outlet socket for the clean fluid, is obtained. Since the sealing surface is completely or at least substantially relieved of axial supporting forces, the sealing surface is subjected only to minimal wear so that seal tightness is ensured over an extended operating time.

It is in principle sufficient that the sealing element is arranged only at the side face of the support collar that forms the sealing surface for the housing component against which sealing action is to be provided. It can be expedient that the support surface at the end face of the support collar is either free of sealing material of the sealing element or is covered by sealing material of reduced thickness or wall thickness in comparison to the wall thickness of the sealing material at the sealing surface. The reduced wall thickness of the sealing material at the support surface at the end face of the support collar leads to a more precise axial force transmission between the housing component and the support collar.

According to a further expedient embodiment, the support collar is embedded by injection molding in the sealing material of the sealing element or the sealing material is foamed onto the support collar. In this way, a fixed connection between the sealing material of the sealing element and the support collar is ensured. The sealing material forms preferably at the same time an end disk that seals the end face of the filter medium body.

According to a further advantageous embodiment, at both side faces, i.e., at the radially inwardly and the radially outwardly facing side faces of the support collar, sealing material of the sealing element is provided. Advantageously, the support collar is completely enveloped by the material of the sealing element, at least in its axially projecting sections.

According to a further expedient embodiment, the support collar comprises a grid structure with grid openings which serve for receiving the sealing material. When applying the sealing element, the sealing material can flow and penetrate into the grid openings of the grid structure so that a fixed connection between sealing element and support collar can be produced. Moreover, the grid structure leads to an improvement of the stability of the support collar so that the support collar is capable of absorbing the axial supporting forces without deformation or without substantial deformation.

According to a further expedient embodiment, the support collar comprises, adjacent to the end disk at the filter medium body, a circumferentially extending support stay which is axially aligned with the end face of the support collar. This circumferentially extending support stay, which is either resting against the filter medium body or is in immediate neighborhood to the filter medium body, improves in a significant way the stability of the support collar.

According to a further expedient embodiment, the support collar is comprised of a radial section and an axial section. The radial section is connected to the central tube, in particular at the radially inwardly positioned rim, wherein the axial section is arranged at the radially outwardly positioned rim of the radial section. The radial section and the axial section form together an annular shoulder which is advantageously covered, at least at its exterior side, completely by the sealing material. It can be expedient that the support stay, which is axially aligned with the end face of the support collar, is located at the transition between the radial section and axial section.

According to a further expedient embodiment, the axial section as well as the radial section of the support collar each are provided with a grid structure. In an alternative embodiment, only one of these sections comprises a grid structure while the other section comprises circumferential stays and radial stays or axial stays but at a greater spacing relative to each other.

As an alternative to the embodiment of the support collar as circumferentially extending shoulder with radial section and axial section, it can also be expedient to provide only an axial section at the support collar which forms the axial extension of the central tube.

According to the invention, the support collar is formed together with the central tube as one piece. Central tube and support collar are in particular formed as injection molded plastic component. In an alternative embodiment, the support collar and the central tube form separate components which however are connected to each other in order to ensure a fixed positioning of the support collar at the central tube and a transfer of the axial supporting forces from the support collar to the central tube.

According to yet another expedient embodiment, the sealing element or a part of the sealing element is resting immediately against the end face of the filter medium body and forms an end disk. Alternatively, a separately embodied end disk can be provided which covers the filter medium body at the end face. The sealing element is then resting advantageously immediately against the end disk. In this context, on the one hand, embodiments are conceivable in which the support collar is enveloped also at its side facing the end disk by the sealing material as well as embodiments in which additional sealing material, past the support collar, is resting immediately against the end disk.

According to a further expedient embodiment, the radially inwardly positioned side face of the support collar forms the sealing surface against which a section of the housing component is resting seal-tightly. It is however also possible that, alternatively or additionally, the radially outwardly positioned side face of the support collar forms the sealing surface.

The housing component of the filter housing for attachment of the filter element is, for example, configured as a connecting socket to which a housing pot for receiving the filter element can be attached. At the housing component there is, for example, on the side facing the filter element, a receiving groove with two concentric side walls delimiting radially the receiving groove; at least one of the side walls is resting seal-tightly against the sealing surface of the support collar.

For transmitting the axial supporting forces from the housing component to the filter element, it can be expedient to arrange at the housing component an axial socket which is facing the filter element and which, in the mounted state, is resting against the end face of the support collar and is axially supported thereat. In the embodiment of the housing component with the receiving groove, the axial socket is inside the receiving groove.

The axial socket comprises advantageously a reduced axial extension at the housing component in comparison to a sealing wall which is resting against the sealing surface of the support collar. In case of a receiving groove at the housing component, the sealing wall is formed by a side wall of the housing component delimiting radially the receiving groove.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
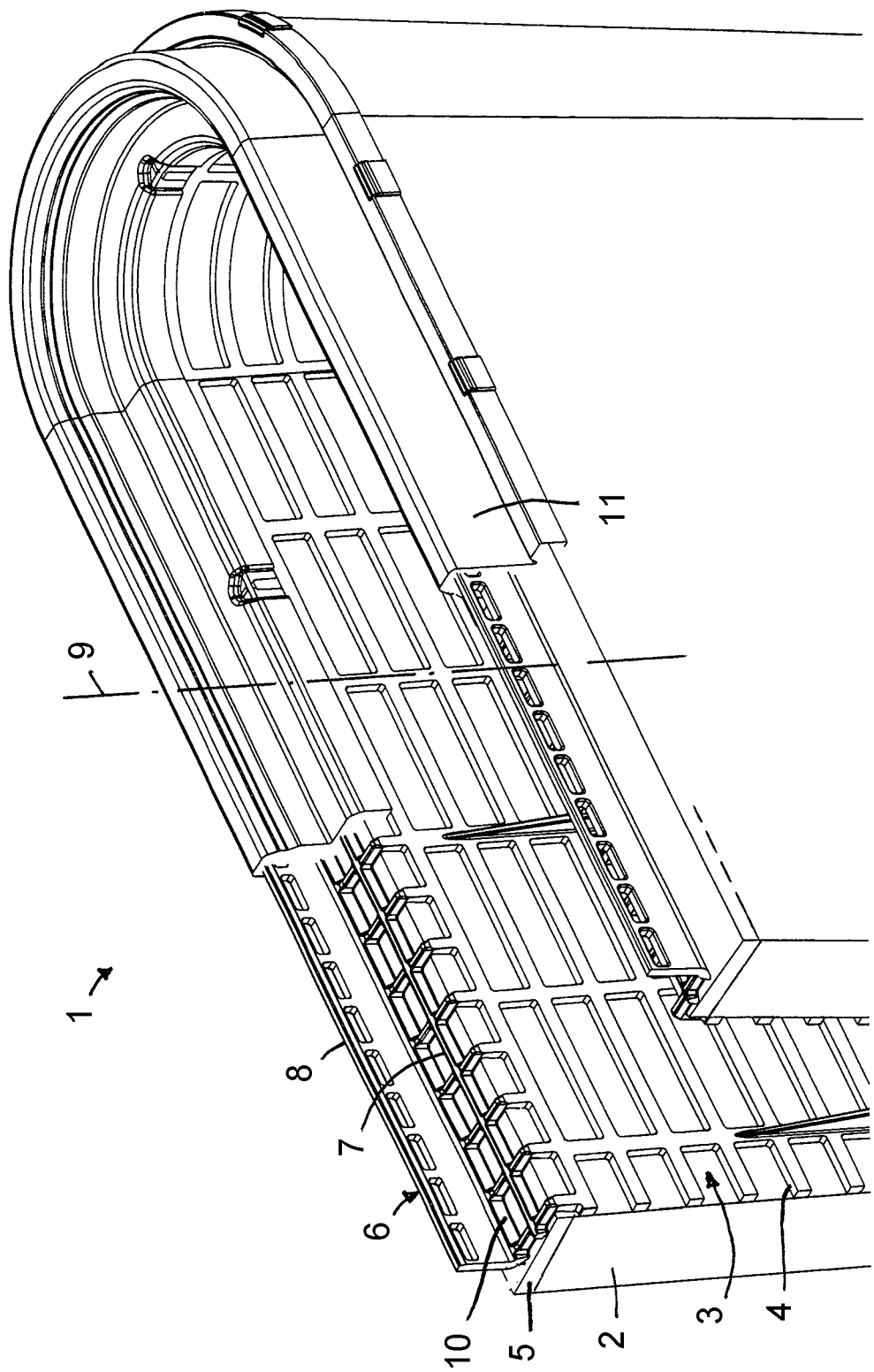
FIG. 1 shows in perspective illustration an annular filter element that comprises at the inner side of the filter medium body a central tube which is formed together with an axially projecting support collar as one piece.

In FIG. 1, a filter element 1 is illustrated that can be used for gas filtration, for example, for an air filter of an internal combustion engine. The filter element 1 is configured annularly and comprises in the embodiment a greatly elongate oval cross section with longitudinal sides that are formed straight or with only minimal curvature in outward direction. The filter element 1 comprises an annular filter medium body 2 where the filtration of the fluid to be cleaned takes place. The filter medium body 2 is flowed through in radial direction from the exterior to the interior by the fluid so that the interior in the filter medium body 2 forms the clean side from which the purified fluid is axially discharged. The interior 3 is lined by a central tube 4 which forms a support grid and which is resting against the inner side of the filter medium body 2 and is embodied preferably as an injection molded plastic component. At least at one end face, preferably at both oppositely positioned end faces, the filter medium body 2 is covered by an end disk 5 which is flow-tightly embodied.

A support collar 6 is configured together with the central tube 4 as one piece and projects axially past the end face of the filter medium body 2 wherein the axial direction coincides with the longitudinal axis 9 of the filter element 1. The support collar 6 comprises a radial section 7 and an axial section 8 which are formed together as one piece. The radial section 7 is connected at the radially inwardly positioned side, facing the interior 3, to the central tube 4. At the radially outwardly positioned side of the radial section 7, the axial section 8 is extending. Thus, the axial section 8 is located radially at a distance to the central tube 4. In radial direction, the axial section 8 is however still located within the outer radius of filter medium body 2 and end disk 5.

The support collar 6 comprises, adjacent to an end face of the filter medium body 2, a circumferentially extending support stay 10 aligned axially with the end face of the support collar 6 and arranged at a transition between the radial and axial sections 7, 8.

The radial section 7 as well as the axial section 8 of the support collar 6 are provided with a grid structure that comprises a plurality of cutouts. These cutouts in the radial and axial sections 7, 8 serve for receiving sealing material of a sealing element 11 that is located on the support collar 6. The sealing element 11 is injection molded or foamed onto the support collar 6; the sealing material is, for example, a PU foam. Since the sealing material penetrates the cutouts of the grid structure in the radial section 7 and the axial section 8, a fixed non-detachable connection between the sealing element 11 and the support collar 6 is ensured. The support collar 6 is advantageously enveloped in outward direction completely by the sealing material of the sealing element 11. The sealing material covers the end face of the filter medium body 2 and forms the end disk 5. The support collar 6 is embedded in the end disk 5.

Figure 2:
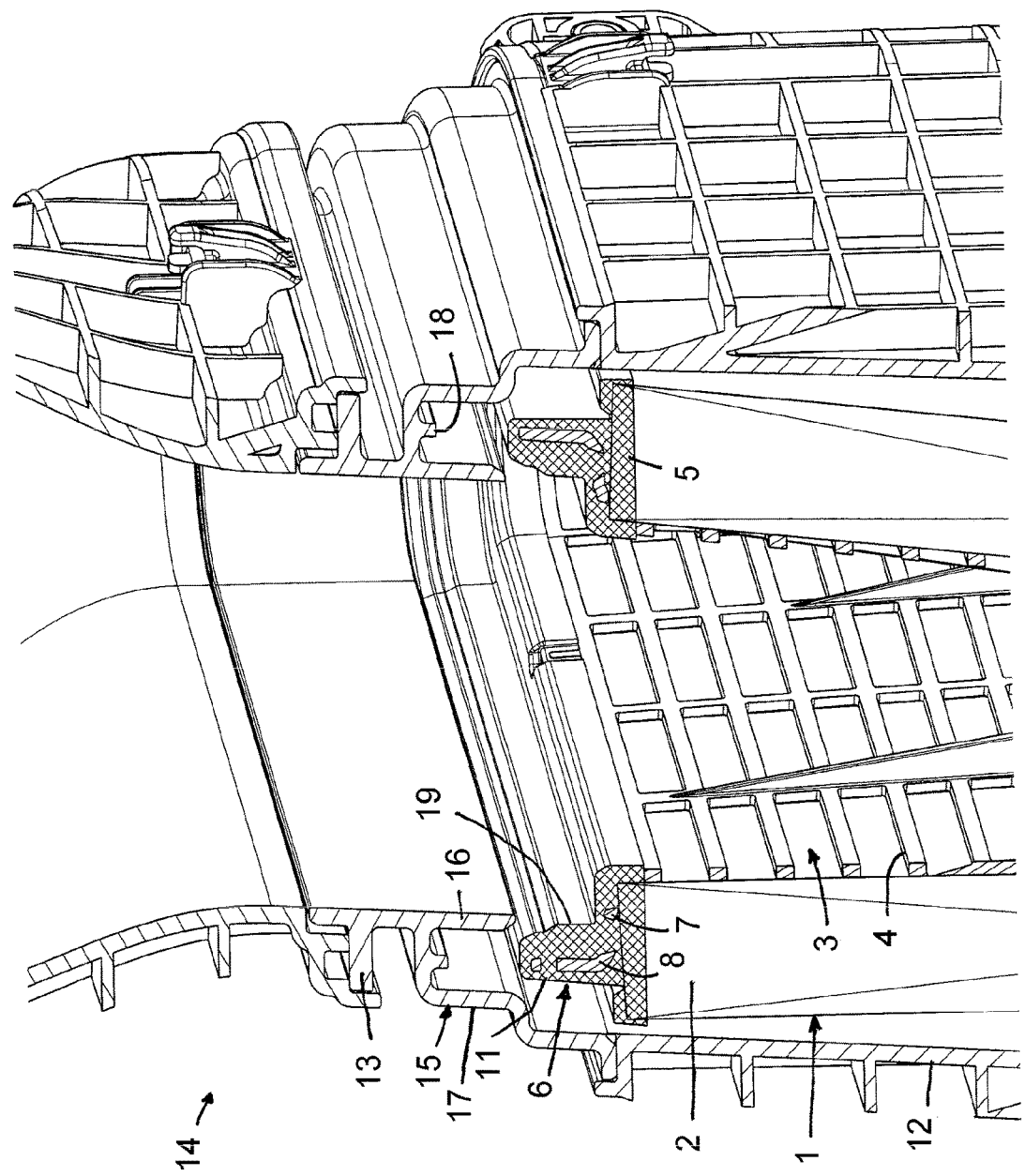
FIG. 2 shows a filter device with the filter element of FIG. 1 in the inserted state in a receiving filter housing with a connecting socket.
Figure 3:
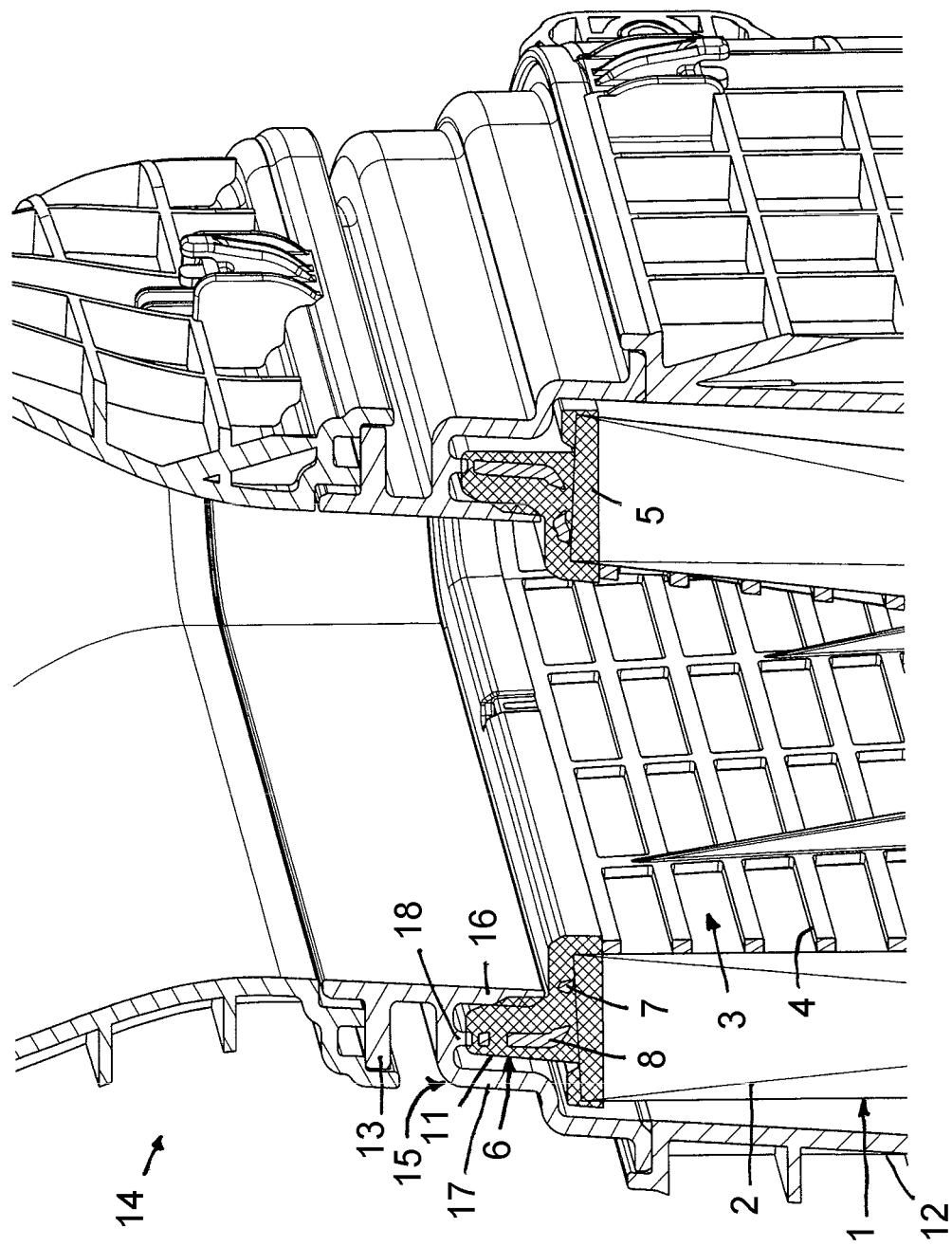
FIG. 3 shows an illustration corresponding to FIG. 2 but in the mounted state wherein the support collar at the filter element is resting against the connecting socket.

In FIGS. 2 and 3, a filter device 14, in particular for gas filtration, is illustrated with the filter element 1 in a filter housing which comprises a filter base housing 12 for receiving the filter element 1 and a housing component 13 connectable to the filter base housing 12. The housing component 13 forms, for example, an outlet socket for the clean fluid. The filter element 1 can be placed onto the outlet socket. The filter base housing 12 can be embodied closed in the end region, which is not illustrated and is facing away from the outlet socket, or can be connectable to a cover so that a closed filter housing is formed. For clarity, in FIG. 2 the components of the filter device 14 are illustrated partially in exploded illustration while FIG. 3 shows the installed position.

The sealing element 11 at the support collar 6 is resting against the top end face of the filter medium body 2 and engages across an end region of the filter medium body 2 radially inwardly and outwardly. The top end face of the axial section 8 forms an axial support surface for the outlet socket 13. In the region of the top end face, sealing material of only minimal thickness of the sealing element 11 is arranged; likewise, sealing material of only minimal thickness of the sealing element 11 is arranged at the radial outer side of the axial section 8 of the support collar 6. In contrast thereto, at the radially inwardly positioned side face of the axial section 8 of the support collar 6 sealing material with significantly greater wall thickness is arranged. This side face of the axial section 8 forms a radial sealing surface for the outlet socket 13.

At the outlet socket 13, a receiving groove 15 is provided which is delimited in radial direction by side walls 16 and 17 which extend radially at a spacing and concentric to each other. At the inwardly positioned bottom of the receiving groove 15, an axial socket 18 is integrally formed which in radial direction is located at the center of the receiving groove 15. The axial extension of the axial socket 18 is significantly smaller than the axial extension of the side walls 16 and 17 delimiting the receiving groove 15. In the mounted state according to FIG. 3, the axial socket 18 is resting against the end face of the axial section 8 of the support collar 6 and exerts an axial force on the support collar 6 which is introduced from the axial section 8 through the radial section 7 into the central tube 4. Since only little sealing material is arranged at the axial end face of the axial section 8, a precise force transmission of the axial forces from the outlet socket 13 to the support collar 6 is ensured.

The inwardly positioned side wall 16 of the receiving groove 15 of the outlet socket 13 is resting in the assembled state against the radially inwardly positioned sealing surface of the support collar 6 where sealing material with greater wall thickness is arranged. Due to the spacing in axial direction as well as in radial direction between the axial socket 18 and the side wall 16, in particular the part at the inner side of the side wall 16 which is in contact with the sealing surface 19, a decoupling of axial support action and radial sealing action is ensured.

What is claimed is:

1. An annular filter element comprising:
    an annular filter medium body which surrounds a longitudinal axis, the annular filter medium body configured to be flowed through in a radial direction by a fluid to be cleaned relative to the longitudinal axis,
        wherein axial, as used herein, refers to a direction of the longitudinal axis,
        wherein radial, as used herein, as a direction traverse to the longitudinal axis;
    a central tube which is annular and elongated axially, the central tube arranged at an radial inner side of the annular filter medium body, the central tube further comprising:
        a support collar which extends circumferentially about and projects radially outwardly from an axial end of the central tube, extending radially outwardly at an axial end face of the annular filter medium body, the support collar comprising:
            a first section of the support collar arranged on the axial end face of the annular filter medium body and projecting radially outwardly from an axial end of the central tube, the first section of the support collar having a grid structure comprising:
a plurality of radially projecting stays, the radially projecting stays having a radial end joined to the axial end of the central tube, the plurality of radially projecting stays spaced circumferentially apart from each other;
a plurality of circumferentially extending stays which bridge between and interconnect to adjacent ones of the plurality of radially projecting stays, the plurality of circumferentially extending stays spaced radially apart,
wherein a radially outer circumferentially extending stay of the plurality of circumferentially extending stays forms a circumferentially extending support stay, supporting the support collar on the axial end face of the annular filter medium body;
a second section of the support collar arranged at the circumferentially extending support stay, and projecting axially outwardly away from the axial end face of the annular filter medium body,
wherein an axially outer end face of the second section forms an axial support surface which is configured to support the annular filter element against a housing component,
wherein the support collar with the first and second sections are formed together with the central tube as one piece;
a sealing element arranged on and connected to the support collar,
wherein a radial side face of the second section carries the sealing element and provides a sealing surface for sealing against the housing component,
wherein the sealing surface is spaced apart from the axial support surface;
wherein the support collar is formed together with the central tube as one piece.

2. The filter element according to claim 1, wherein the support collar comprises
a grid structure with grid openings configured to receive a sealing material of the sealing element.

3. The filter element according to claim 1, wherein the circumferentially extending support stay is aligned axially with the axial support surface of the support collar,
wherein the support stay is arranged at a transition between the first section and the second section.

4. The filter element according to claim 1, wherein the second section of the support collar is enveloped completely by a sealing material of the sealing element.

5. The filter element according to claim 1, wherein the sealing element is resting in sections against the axial end face of the annular filter medium body.

6. The filter element according to claim 1, wherein the sealing element extends across the axial support surface of the support collar and has a thickness at the axial support surface of the support collar that is smaller than a thickness at the radial side face.

7. The filter element according to claim 1, wherein the radial side face that provides the sealing surface is a radially inwardly positioned side face resting seal-tightly against the housing component.

8. A filter device comprising:
an annular filter element according to claim 1;
a filter housing configured to receive the annular filter element and comprising
the housing component,
wherein the filter element is inserted into the filter housing such that the axial support surface of the support collar supports the annular filter element at the housing component and the housing component rest seal-tightly against the sealing surface of the support collar.

9. The filter device according to claim 8, wherein the housing component comprises a receiving groove into which the sealing element of the annular filter element is received and engages, the receiving groove facing the annular filter element;
wherein the receiving groove has an axial socket formed as a projection between opposite sidewalls of the receiving groove, projecting from a base of the receiving groove towards the axial support surface of the support collar, and the axial socket is supported at the end face of the support collar.

10. The filter device according to claim 8, wherein
a side wall of the housing component rests radially seal-tightly against the sealing surface of the support collar and
an end face of the side wall of the housing component is positioned axially at a spacing relative to the support collar.

* * * * *